(12) United States Patent
Gasper et al.

(10) Patent No.: US 6,373,488 B1
(45) Date of Patent: Apr. 16, 2002

(54) THREE-DIMENSIONAL TREE-STRUCTURED DATA DISPLAY

(75) Inventors: Elon Gasper, Bellevue; Robert Dain, Newcastle; Boon Chew, Seattle, all of WA (US)

(73) Assignee: Sierra On-Line, Bellevue, WA (US)

( * ) Notice: Subject to any disclaimer, the term of this patent is extended or adjusted under 35 U.S.C. 154(b) by 0 days.

(21) Appl. No.: 09/420,606

(22) Filed: Oct. 18, 1999

(51) Int. Cl.$^7$ .............................................. G06T 17/00
(52) U.S. Cl. ...................................... 345/427; 345/419
(58) Field of Search ................................ 345/418, 419, 345/420, 425, 426, 427, 429

(56) References Cited

U.S. PATENT DOCUMENTS

| | | | | |
|---|---|---|---|---|
| 5,555,354 A | * | 9/1996 | Stranick et al. | 345/427 |
| 5,668,939 A | * | 9/1997 | Numao et al. | 345/427 |
| 6,151,028 A | * | 11/2000 | Kumagai et al. | 345/427 |
| 6,268,862 B1 | * | 7/2001 | Uchiyama et al. | 345/419 |

* cited by examiner

Primary Examiner—Cliff N. Vo
(74) Attorney, Agent, or Firm—LaRiviere, Grubman & Payne, LLP (57) ABSTRACT

A computerized method for three-dimensional display of tree-structured data using an intermediary restructured data set to facilitate compatibility with graphics programs, such as the Virtual Reality Modeling Language. An exemplary embodiment transformation of genealogical data illustrates an application.

13 Claims, 7 Drawing Sheets

| | | | | | | | | | | |
|---|---|---|---|---|---|---|---|---|---|---|
| IND | 0 | 4 | 0 | Bob/McNutt/ | – | BLUE | BLACK | BLACK | | |
| IND | -1 | 5 | 2 | Terri/McNutt/ | – | RED | BLACK | BLACK | | |
| IND | -2 | 3 | 1 | Timothy/Dain/ | – | BLUE | BLACK | BLACK | | |
| IND | -2 | 3 | 0 | Philip/Dain/ | – | BLUE | BLACK | BLACK | | |
| IND | -1 | 5 | 0 | Wendy/Dain/ | – | RED | BLACK | BLACK | | |
| IND | -1 | 1 | 0 | Bob/Dain/ | – | BLUE | BLACK | BLACK | | |
| IND | 0 | 2 | 0 | Arlene/Blake/ | – | RED | BLACK | BLACK | | |
| IND | 0 | 0 | 0 | Jerry/Dain/ | – | BLUE | BLACK | BLACK | | |
| IND | 0 | 6 | 0 | Martha/Loche/ | – | RED | BLACK | BLACK | | |
| DEC | -1 | 5 | 0 | 0 | 6 | 0 | 0 | 4 | 0 | GREEN |
| SIB | -1 | 5 | 2 | -1 | 5 | 0 | GREEN | | | |
| DEC | -2 | 3 | 0 | -1 | 5 | 0 | -1 | 1 | 0 | GREEN |
| SIB | -2 | 3 | 1 | -2 | 3 | 0 | GREEN | | | |
| DEC | -1 | 1 | 0 | 0 | 2 | 0 | 0 | 0 | 0 | GREEN |

THREE-DIMENSIONAL TREE-STRUCTURED DATA DISPLAY

BACKGROUND OF THE INVENTION

1. Field of the Invention

The present invention relates generally to computerized data processing and, more specifically, to a three-dimensional data display format for "tree-structured data". The preferred embodiment will be disclosed using the term "tree-structured data" for the sake of simplicity and clarity; however, in more strictly mathematical terms the data could more precisely be termed a network, or directed graph. In any case, it should be apparent to anyone with normal skill in the art that this preferred embodiment covers and/or is obviously extensible to network data structures in general.

2. Description of Related Art

In the field of computer technology, it is known that some output data sets are best displayed as a graphical figure that demonstrates the inter-relationship between individual data points or members of the set. For example, it is well known to display genealogical information as a graphical "family tree", or to show business plan alternative paths as a graphical "fish-bone" diagram. For the purpose of describing the details of the present invention, such graphical figures used to represent output data sets are all generically defined and referred to as "tree-structured data" and an exemplary embodiment for genealogical data sets is used; no limitation on the scope of the invention is intended by the inventors in using this exemplary embodiment nor should any such limitation be implied therefrom.

An industry standard data format for genealogical information is Genealogical Data Communication, or "GEDCOM", which uses a standard ASCII file format. Each line contains one data element. [A complete description of the GEDCOM file format is available from Burgoyne Computers and Services, Utah, or on the Internet by anonymous ftp at ftp.gedcom.org in the directory /pub/genealogy/gedcom. Further description here is not necessary to a full understanding of the present invention.]

An industry standard output data format for displaying three-dimensional data via World Wide Web browser programs is Virtual Reality Modeling Language, or "VRML", which also uses a standard ASCII file format. Each line contains one or more VRML source code instructions. [A complete listing of the VRML specification is available on the Internet at www.vrml.org of the 3D Web Consortium. Further description here is not necessary to a full understanding of the present invention.] Other proprietary output data formats are used in the state of the art for generating three-dimensional displays, most notably for computer video games.

Figure 1:
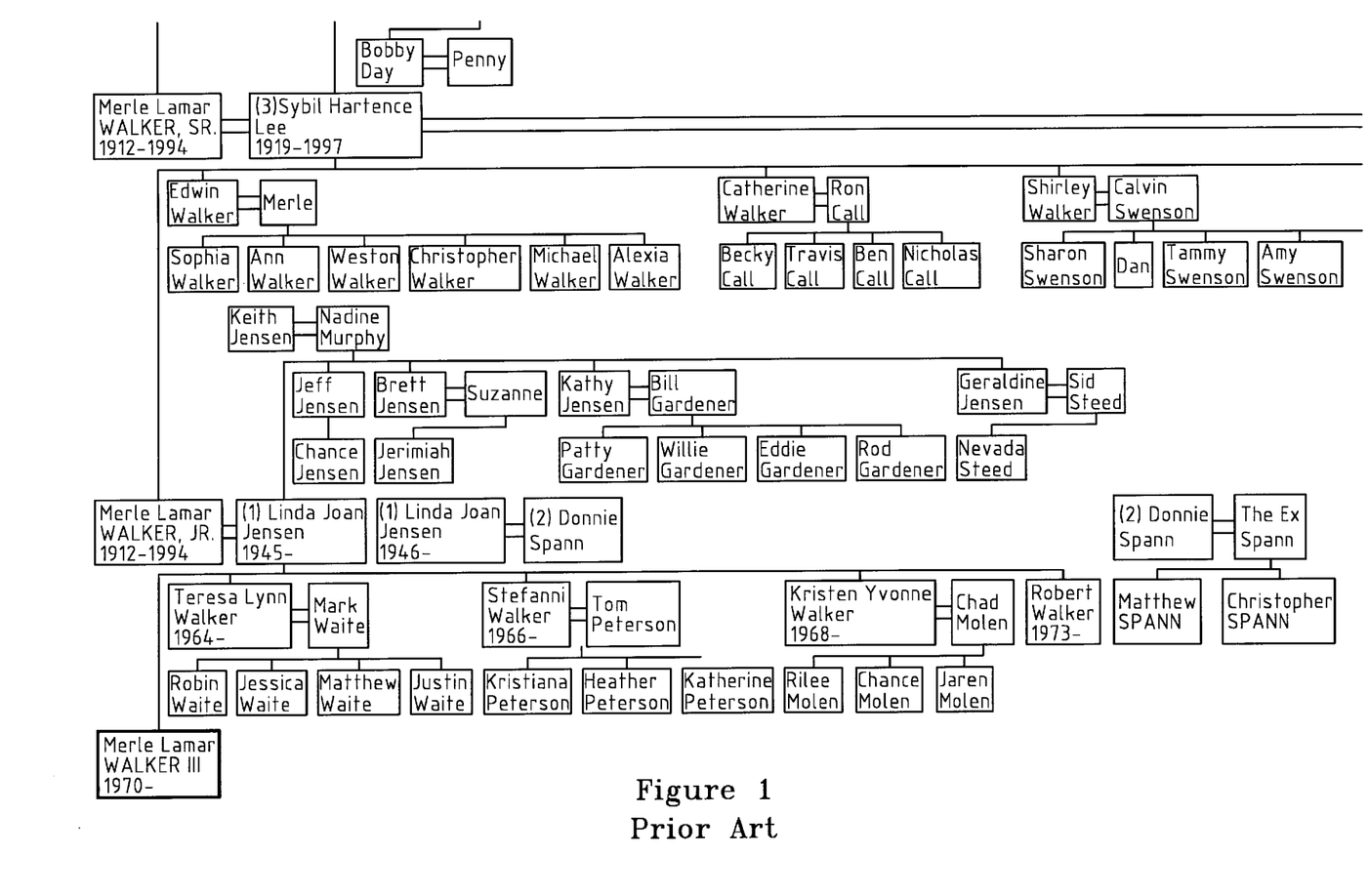
FIG. 1 (Prior Art) is a genealogical data set as displayed by a product currently offered in the marketplace of the present invention.

Current products have limitations on the ability to display "tree-structured data" in that two-dimensional formats are used. One genealogical software product is Generations by Sierra On-Line, Inc., Bellevue, Wash., assignee of the present invention. Most products require "pedigree" charts of a family tree to be on separate pages and thus separate display screen or separate windows of a screen. In other words, a display is limited to one genealogical off-spring per screen display, requiring an end-user to jump back and forth to different screens to follow each path of the tree. Even for a product showing an entire tree on one screen, screen physical size makes the structure more difficult to read as the tree grows and font size shrinks. For example, the XXX™ product from Broderbund Software Company has a display as shown in FIG. 1 (Prior Art).

There is a need for an improved mechanism for displaying tree-structured data.

SUMMARY OF THE INVENTION

In its basic aspects, the present invention provides a single screen display for tree-structured output data sets. Moreover, it enables examination and analysis of the three-dimensional "shape" of a tree-structured data set.

The foregoing summary and list of advantages is not intended by the inventor to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprize the public, and more especially those interested in the particular art to which the invention relates, of the nature of the invention in order to be of assistance in aiding ready understanding of the invention in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

APPENDIX A is a three-dimensional tree modeling language specification for the present invention as shown in FIG. 2 for the exemplary embodiment of a genealogical data set as typified in FIG. 3.

The drawings referred to in this specification should be understood as not being drawn to scale except if specifically annotated.

DESCRIPTION OF THE PREFERRED EMBODIMENT

Reference is made now in detail to a specific embodiment of the present invention, which illustrates the best mode presently contemplated by the inventor for practicing the invention. Alternative embodiments are also briefly described as applicable.

Figure 2:
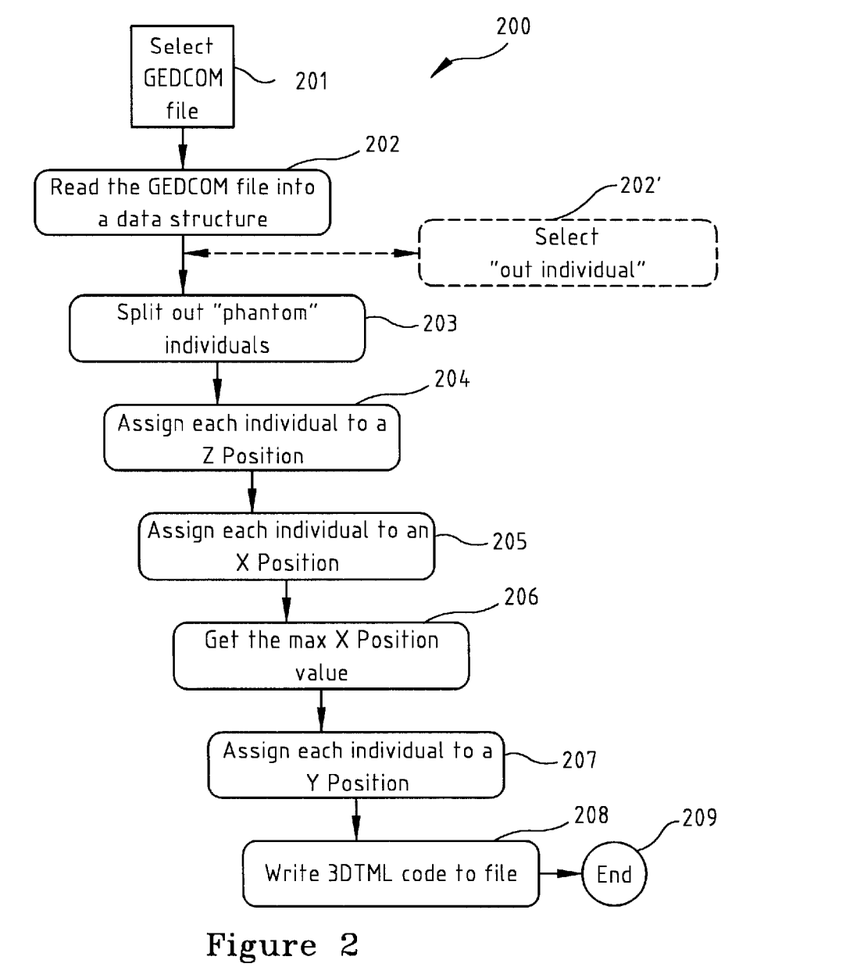
FIG. 2 is a flow chart of the process in accordance with the present invention.

FIG. 2 is a flow chart of the process, also referred to hereinafter as the Three-Dimensional Tree Modeling Language, 3DTML 200 in accordance with the present invention. The source code for the 3DTML 200 is in C++, an established programming code well-known to those skilled in the art; further description herein is not required for an understanding of the present invention. As an exemplary embodiment, a tree-structured data set for genealogical data is used.

Figure 3:
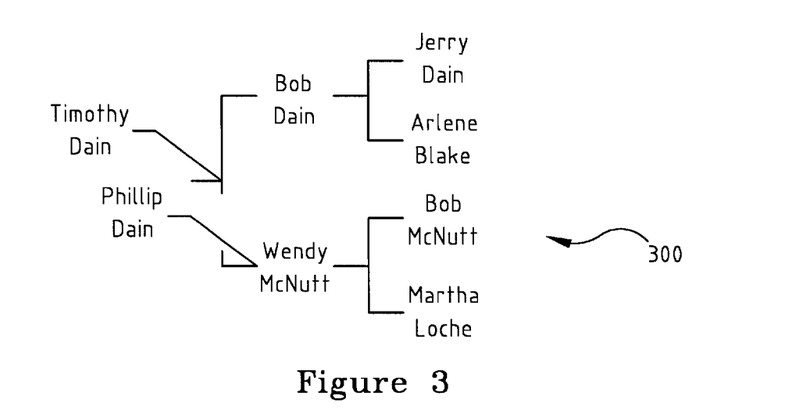
FIG. 3 is a manual graphical depiction of an exemplary family tree to be converted with the process in accordance with the present invention as shown in FIG. 2.

To start, illustrated as step 201, an end-user selects a GEDCOM file containing a family tree data set. An exemplary family tree 300 is shown in FIG. 3. Obviously, the end-user has significant data, such as relational position, e.g., wife, child and the like, sex type, dates of birth, death or other significant data, about each person, or other object of interest, of the particular data set. In this exemplary embodiment, each member of the family is a discrete object of interest having both elements of individual identity defining characteristics and specific tree-structure interconnection characteristics with respect to each other.

Figure 4:
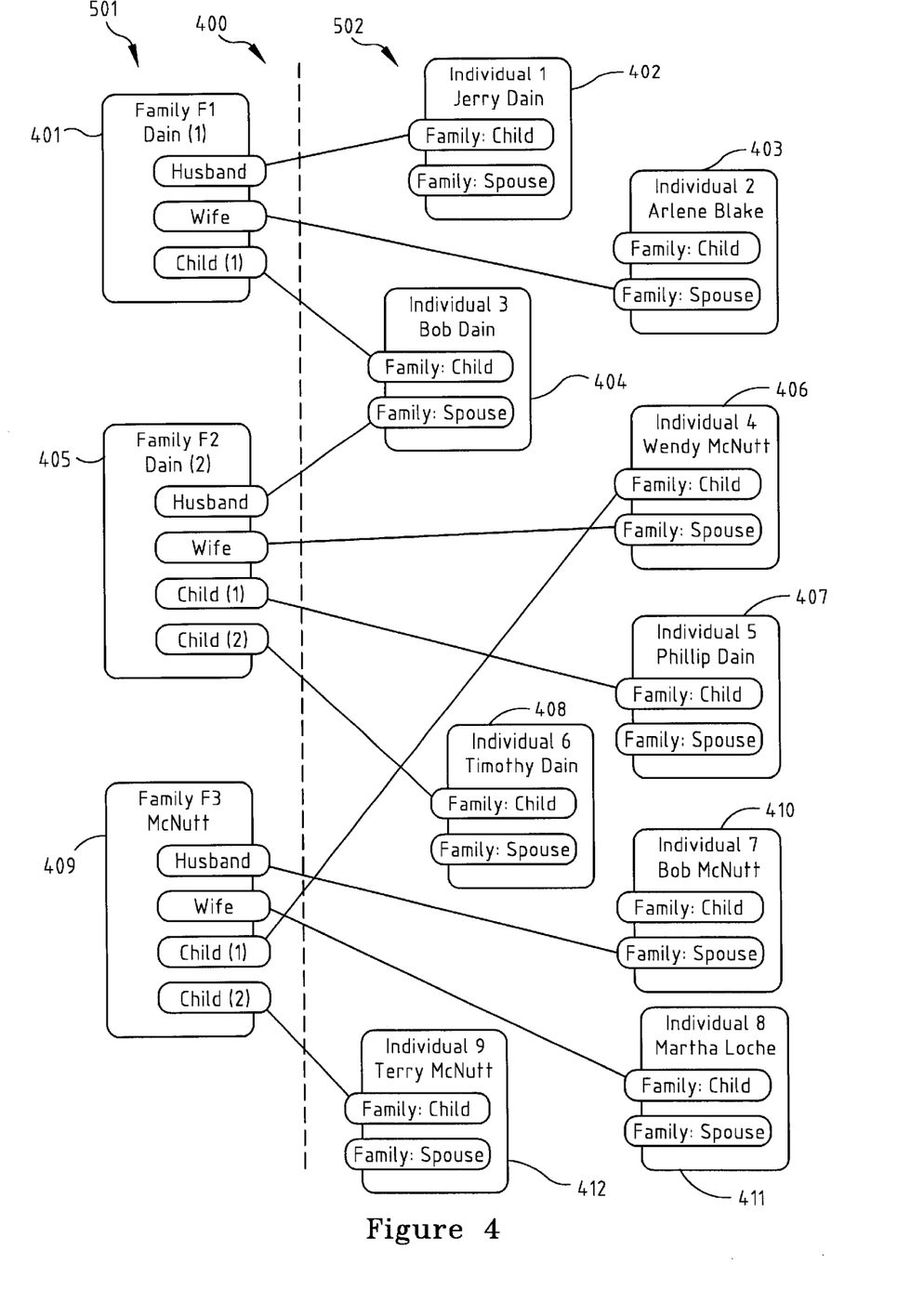
FIG. 4 is a data structure for the exemplary family tree as shown in FIG. 3 to be converted with the process in accordance with the present invention as shown in FIG. 2.

The selected GEDCOM family tree data set file is restructured, step 202, into a corresponding 3DTML data structure 400 shown in FIG. 4.

Each family tree data set comprises single family data subsets 401, 405, 409. For example, for "Family F1" 401 having a husband, Jerry Dain, wife, Arlene Blake, and one child, Bob Dain.

Each single family data subset 401, 405, 409 is linked appropriately to that family's members individual's identity defining characteristics sub-subsets. For example, for the single family data subset "Family F1" 401, three individual identity defining characteristics sub-subsets are: (1) Jerry Dain being "Individual 1" 402, a "Spouse" in Family F1 and being specified as the "husband" in that family, (2) Arlene Blake being "Individual 2" 403, a "Spouse" in Family F1 and being specified as the "Wife" in that family, and (3) Bob Dain being "Individual 3" 404, a "Child" in Family F1 and being specified as "Child 1" in that family, and also being a "Spouse" in "Family F2" 405 and being specified as "Husband" in the family.

The analysis of the 3DTML data structure 400 is the same for the rest of the subsets 406 through 412 for each of the other two Families 405, 409 and each of the other individuals, 406, 407, 408, 410, 411, 412.

Figure 5:
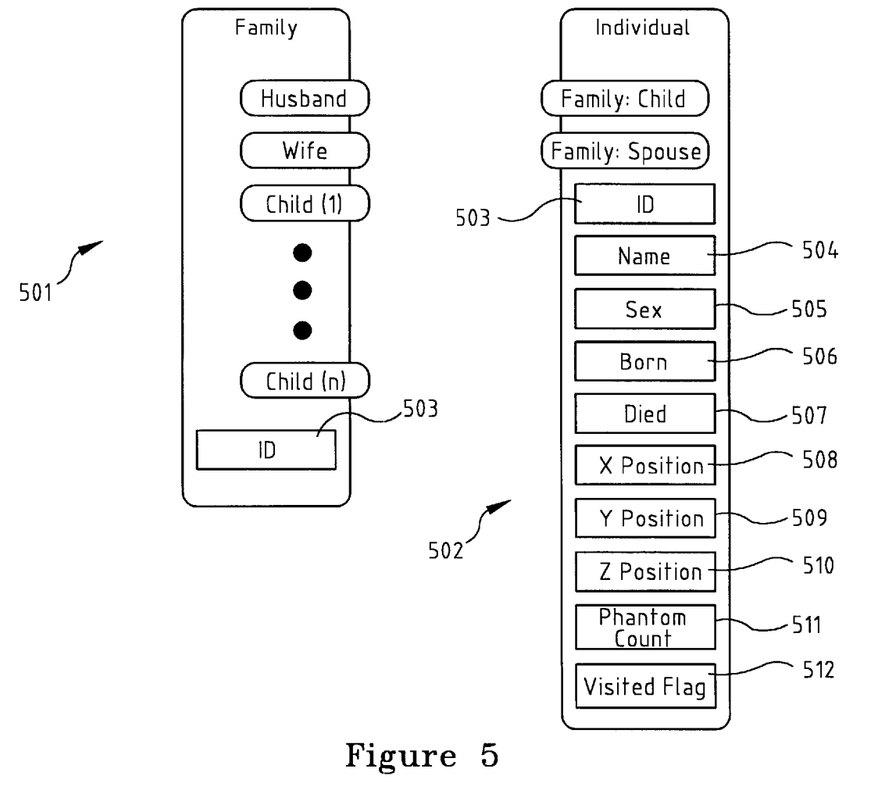
FIG. 5 is an illustration showing data classification in accordance with the present invention as shown in FIG. 2.

Thus, when a selected GEDCOM file is read 202 into computer memory for processing and translation, it is stored in the restructured data format that consists of two classes, a "family Class" 501 and an "Individual Class" 502, which correspond to the "FAM" and "INDI" data header tags used in the GEDCOM data format. The size and shape of the 3DTML data structure 400 is determined by the contents of the GEDCOM file.

FIG. 5 diagrams the prototypical class data structures. Each Class 501, 502 has multiple members. The rectangular members represent internal data elements 503 through 512, that is an individual family member's personal data. The oval members are references to individual's identity defining characteristics sub-subsets as shown in FIG. 4 (note again, these internal data elements are exemplary and not intended to be exclusive of other data relevant to members of the family tree data). Each ensuing operation parses the 3DTML data structure 400 and modifies information in the internal data elements 508–512. Several internal data elements are self-explanatory: Name 504, Sex, 505 Born 506, Died 507.

Parsing of the 3DTML data structure 400 begins at a root individual. A root individual can be defaulted to the first person listed in the GEDCOM family tree data set file selected 20. In the alternative, the end-user may be provided with an option of choosing an arbitrary selected individual to be the root individual. Data parsing for the 3DTML begins with the root individual. Each individual is assigned a sequential identification number, "ID" 503. It will be recognized that changing the root individual will change the data parsing order and therefore may change the shape of the final display output.

A special category of individual is arbitrarily denoted as a "phantom", where a phantom is a person that is part of multiple families; e.g., a person who has married multiple times. Returning also to FIG. 2, the next step 203 is to parse the data structure checking for phantoms and when found, replicating the data structure for that individual for each Family 401, 405, 409 where the phantom is integrally related. If an individual is only associated with one Family, that individual's "Phantom Count" 511 of that individual's internal data elements is set to zero. The Phantom Count 511 of a phantom's internal data elements is numbered, staring with one for the first phantom instance in the tree. Each individual is analyzed until all Phantom Counts 511 are assigned.

Next, step 204, a "Z-Position" 510 individual's internal data element is assigned to each individual. This operation parses the data structure 400 and assigns each individual to a Z-position or layer in three-dimensional Cartesian coordinates. The root individual is placed in layer zero. Each time a sibling or a phantom is encountered, that individual is placed on the next consecutive layer, and parsing continues for all individuals. The concept of "phantom" applies to the specific example of family tree data, and not necessarily to general tree-structured data.

For example, referring to FIG. 3, there are two Families with multiple siblings in the sample GEDCOM family tree data set 300. If Philip is the root individual, he will be placed on layer zero. His parents and grandparents are also placed on layer zero because there are no phantom or sibling conditions to force them to another layer. When Timothy is encountered—assuming before Terri—he is placed on layer 1, the next unused layer, because he is a sibling of Philip. Terri is placed on layer 2. At the end of the Z-Position parsing operation, all individuals have a Z-Position 204 assigned.

Note that a phantom individual can be a root individual. Since the root individual is merely the data parsing beginning point, the phantom will have a Z=0 for the first Family occurrence, and a Z incremented position for each subsequent family tree location.

Next, step 205, each individual is assigned an "X-Position" 508 of the individual's internal data elements. This operation parses the data structure 400 and assigns an X-position in three-dimensional Cartesian coordinates. The X-position is simply defined as increasing in the direction of ancestors, and decreasing in the direction of descendants. For the root individual, X=zero; X is incremented equally for each generational step in the pedigree chart; and, X is set to the same number as an individual for that individual's siblings and spouses.

Thus, to continue the example, if Philip is the root individual, X=0, then brothers Philip and Timothy will both be at X=0, their parents Bob and Wendy and aunt Terri are at X=1, and the grandparents Jerry, Arlene, Bob and Martha are at X=2, where a generational increment is defined as 1.

Note that if a root individual is not at a terminus of the tree structure, X can be a negative number. For example, if Bob Dain is user selected as the root individual where Bob's X=0, Timothy and Philip have X =1.

The next step 206 is to determine the greatest value of X-Position, set as the X-Position value of the oldest generation individual of the family tree. In the example, $X_{max}$= 2. If Philip's children were shown at X=−1, the greatest X value would still be 2.

The next step 207 parses the data structure and assigns a "Y-Position" 509 for each individual's internal data elements. Y values are greater in the tree path direction of the mother, and lower in the tree path direction of the father. The root individual is again set to Y=0. Y increments are dependent on X values. The Y offset between spouses at the $X_{max}$ position is predetermined as 2 and doubles for each successive generation. The Y offset between parents and siblings at the $X_{max}$ position is predetermined as 1 and doubles for each successive generation.

Thus, in the example where Philip is the root individual, if his grandfather Jerry is the next individual considered, Jerry is Y=1; his spouse is incremented by 2, so Y=3 for Arlene. Since Jerry is at Y=1, then Bob is at Y=2. The Y offset from Bob to Philip is thus 2 and the Y offset from Bob to Wendy is 4. The Y offset to Philip's children in the future would be 4 and the Y offset to Philip's future spouse would be 8.

Figure 6:
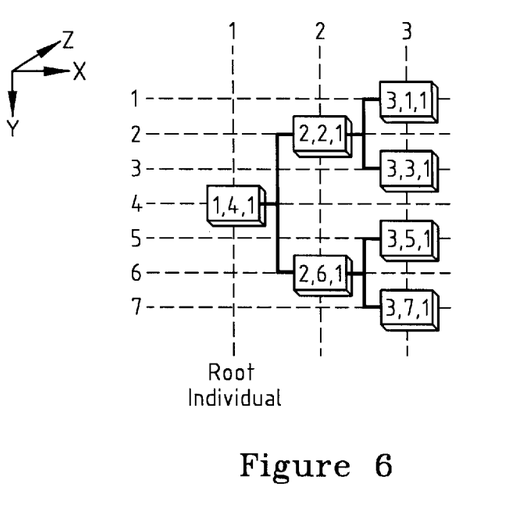
FIG. 6 is an illustration showing a three-dimensional coordinate system in accordance with the present invention as shown in FIG. 2.

Referring also now to FIG. 6, the 3DTML coordinate system is illustrated generically. It will be recognized by those skilled in the art that the Cartesian coordinates can be rotated to adapt to a vertical tree-structured data system.
Visited Flag The Visited Flag 512 is used during the parsing operation to keep track of which individuals have already been processed, and which still require processing.
N-Dimensional Data Two-Dimensional tree-structured data display is already in the public domain (pedigree charts, chain-of-command organizational charts, single-elimination tournament charts, etc.) Data of dimensionality 4 or greater cannot be displayed unless it is first reduced to 1, 2 or 3 dimensions. There are a number of well-known techniques for reducing the dimensionality of high-order data sets. Four-dimensional data, for example, can be viewed as a three-dimensional data set that changes over time, where time represents the fourth dimension. Three-dimensional "shadows" of high-order data sets can be cast via mathematical manifolds, as another example.

Tree-structured data itself is dimensionless. It is typically displayed in two dimensions, but that is independent of the data.

This invention should apply to high-order data whenever that data is reduced to three dimensions and displayed as a three-dimensional tree structure. It should apply regardless of any "tricks" that may be used to represent higher dimensionality axes in the three-dimensional tree structure, such as color, size or position encoding in the nodes or connections, nodes or connections that change over time, animations, graphs or images on the nodes or connections, etc.

Figure 7:
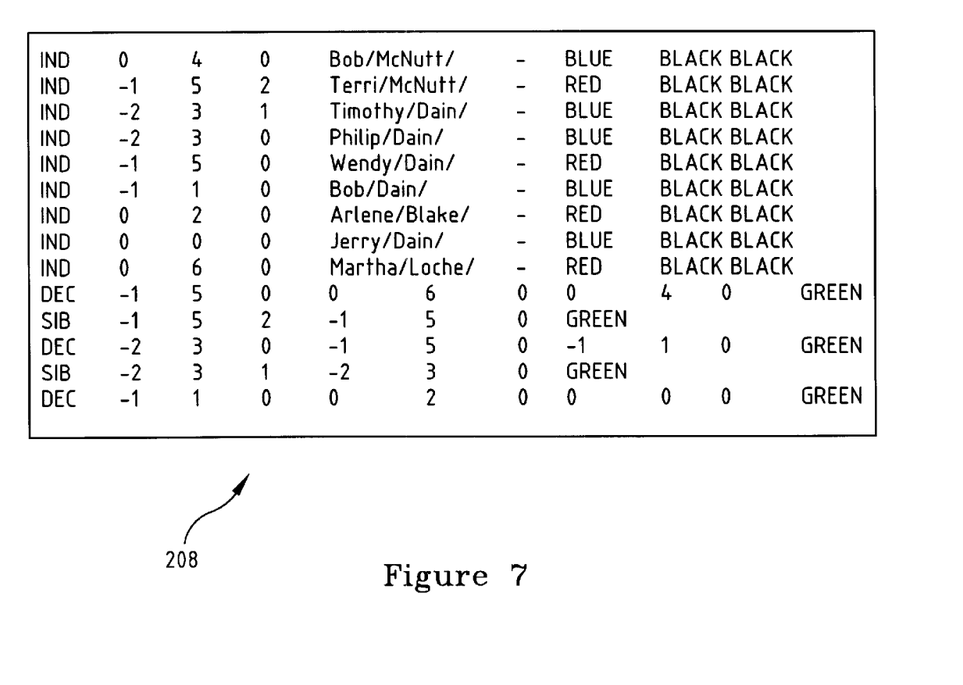
FIG. 7 is a restructured data set for the exemplary family tree as shown in FIG. 3 to be converted with the process in accordance with the present invention as shown in FIG. 2.

Once all individuals internal data elements 503–512 are assigned, the 3DTML restructured family tree data set is saved to a file, step 208. The writing 208 of the 3DTML code to a file includes the data for each individual and the connection in the data structure. For the example given, the code is shown in FIG. 7, where the 3DTML Language Specification used is given in Appendix A. This ends the process of restructuring of the GEDCOM family tree data set into the 3DTML restructured family tree data set.

It should be noted that setting the coordinate set at X, Y, Z =0, 0, 0 is completely arbitrary as the starting position in the exemplary process. The root node could just as easily be set to a random position and the rest of the tree related thereto. In addition, the order of processing the coordinates is arbitrary; any of the three coordinates may be processed first and either of the remaining two may be processed thereafter in any order.
Color Listings The three color names on the individual (IND) and Phantom (PHI) lines are to specify box color, name color and data color, respectively. On the connection (DEC and SIB) lines, the color name represents the color of the connection lines. In the current implementation, these colors are hard coded into the VRML templates. The color tags are defined in the 3DTML specification.

Figure 8:
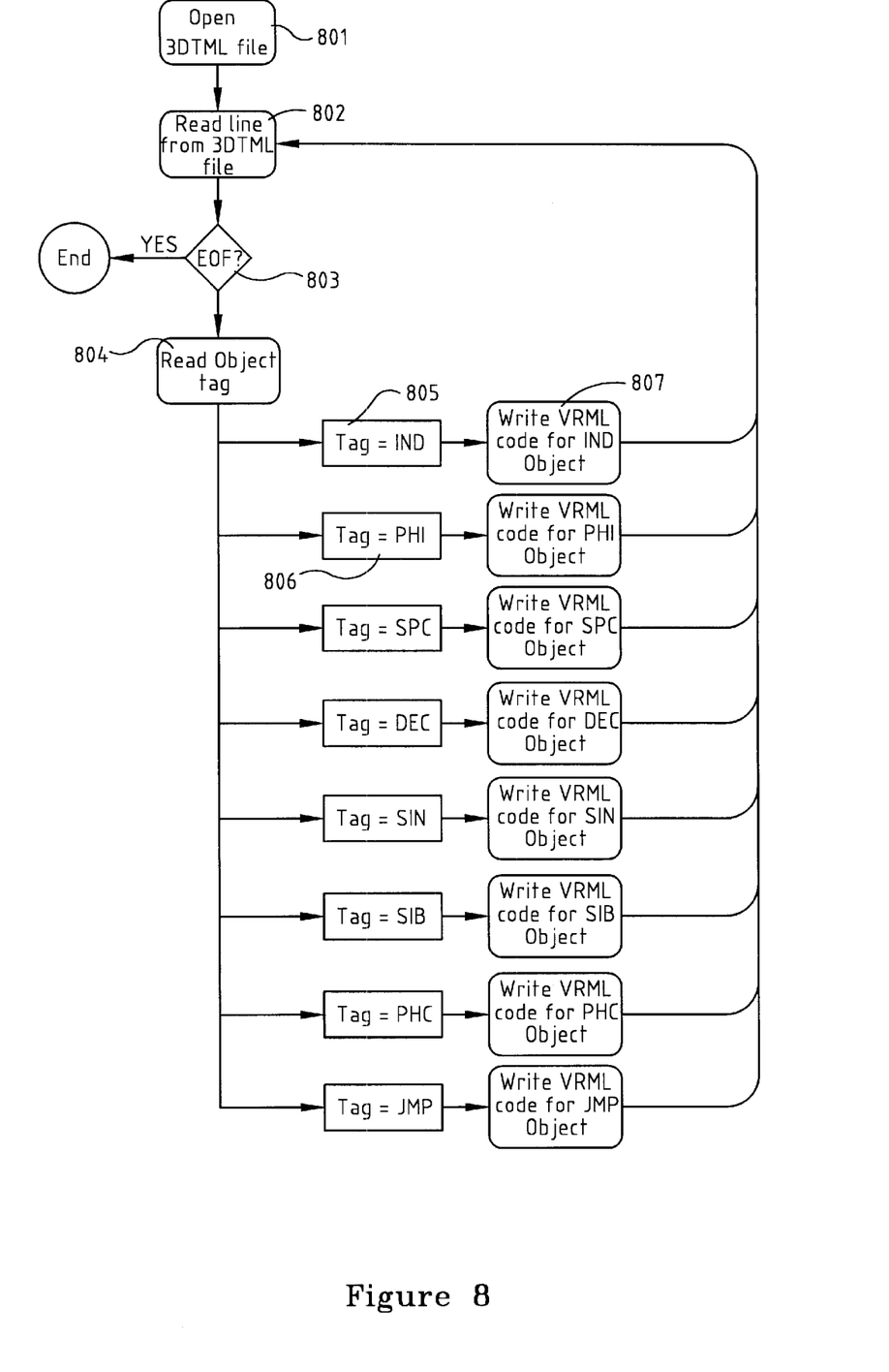
FIG. 8 is a flow chart showing the conversion of a restructured data set converted with the process in accordance with the present invention as shown in FIG. 2 into an exemplary video display graphics language.

FIG. 8 depicts an exemplary process for converting the 3DTML restructured family tree data set to a graphics language format. In the exemplary embodiment described, the VRML graphics language is one such commercially available program. The file having the 3DTML restructured family tree data set is opened, step 801. As is known in the art, the file is read, line-by-line for conversion, step 802, until finished End-of-File marker (EOF), step 803. For each line of data, a header object tag in accordance with the 3DTML Specification (Appendix A) is read, step 804, to identify the type of code being translated. In a VRML conversion, for each line of 3DTML code, approximately fifty to three hundred lines of VRML code may be generated, step 807, and stored, step 808, to create a complete template for the actual video display. In other words, each 3DTML statement line as shown in FIG. 7 defines one or more graphical objects. VRML uses a given collection of VRML template files to generate the final VRML output. Each template file contains the VRML code to create one graphical object, but key location, size and orientation values have been replaced with generic text strings. This process replaces the generic text strings with actual data values derived from the 3DTML line statements.

The exemplary process discussed elsewhere in this specification moves data through several states before generating final computer video display. All of those states are not necessarily required since VRML, a video graphics display language, is an optional step in the process. The final video image could be displayed without the data ever being represented in the form of a video graphics display language. Since a video image is really just a bit pattern stored in memory of the computer display hardware, no language representation is required. Some other possible processes are shown below.

Original Data→3DTML→VRML→video display of the present invention
Original Data→VRML→video display
Original Data→3DTML→video display
Original Data→video display Again, it will be recognized by a person skilled in the art that the restructured family tree data set as specified in Appendix A is convertible into any number of public or proprietary three-dimensional graphics languages, e.g., QuickDraw, DFX, etc., via custom-developed translation software, and is also convertible directly into a computer image via custom-developed software based on any number of public or proprietary computer graphics languages to tools, e.g., OpenGL, Direct3D, etc. The exemplary system described herein is an example of custom-developed translation software.

Figure 9:
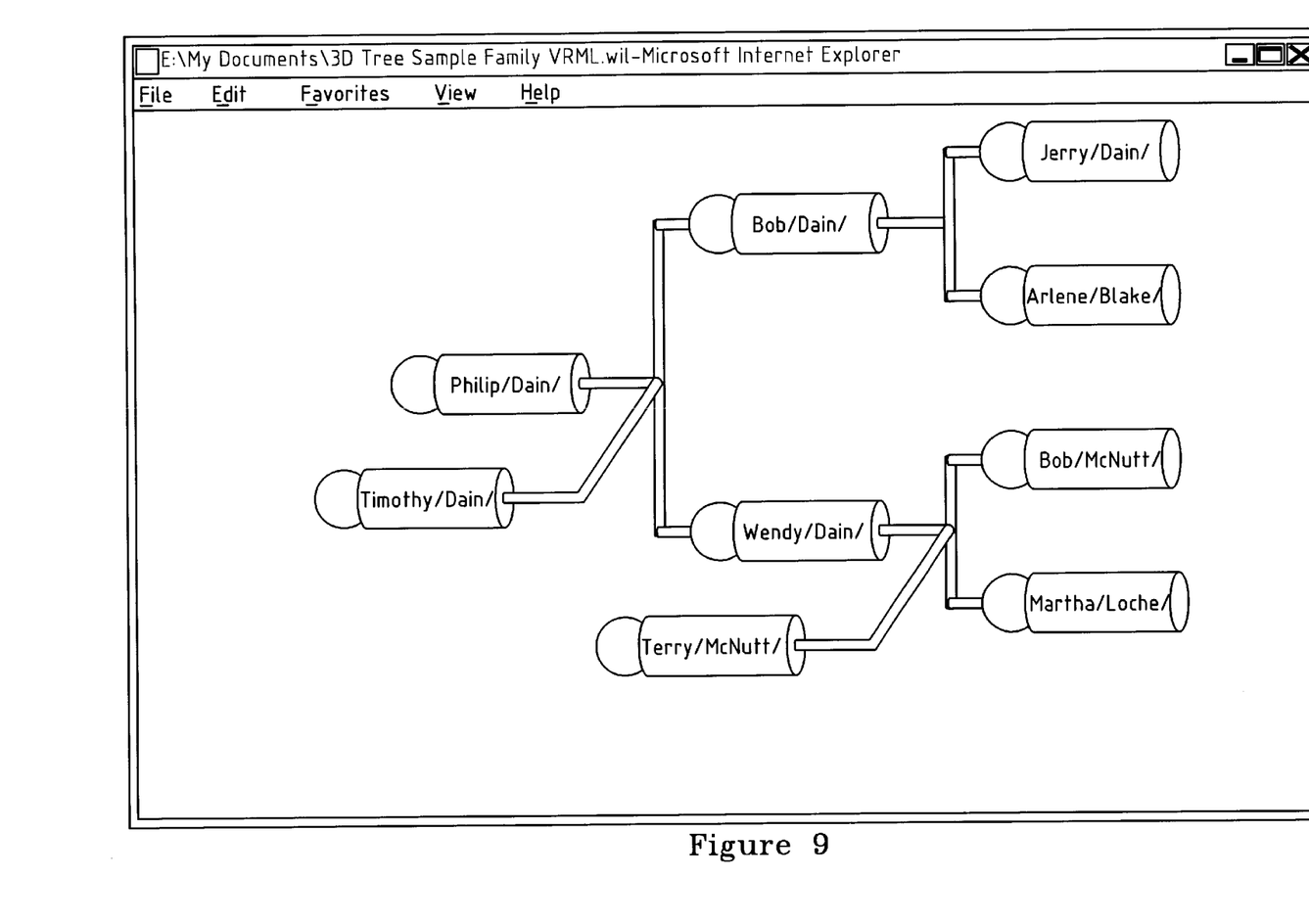
FIG. 9 is a pictorial view of an exemplary video screen in accordance with the present invention as shown in FIG. 2.

When the EOF marker is recognized, step 803, the entire 3DTML restructured family tree data set has been converted to the VRML graphics language and stored. The end-user can thereafter use the VRML file in accordance with the graphics application software. For the exemplary embodiment described, a rendered VRML three-dimensional tree structure is shown in FIG. 9 which can be manipulated—e.g., rotated, zoomed, individual selected, or the like—by the end-user using VRML display programs.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result; for example, it is well known that in computer programming many steps are actually interrelational and inter-reliant subroutines. The embodiment was chosen and described in order to best explain the principles of the invention and its best mode of practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean one and only one unless explicitly so stated, but rather means one or more. Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ".

Appendix A:3D Tree Modeling Language Specification

Object Types

1. Individual (IND) - a box that contains the name, birth date and death date for an individual

2. Phantom individual (PHI) - a duplicate individual box (rendered in a different style)

3. Spouse connection (SPC) - connects two boxes on the same plane

4. Descendant connection (DEC) - connects three boxes on the same plane

5. Single parent connection (SIN) - connects a child to one parent

6. Sibling connection (STB) - connects a new box to a descendant connection on a different plane 7. Phantom connection (PHC) - connects a phantom box to a box on a different plane 8. Special case jumper connection (JMP) - connects two boxes that may or may not be on the same plane (appearance to be determined)

Format
Individual boxes:
[IND / PHI]   X-Y-Z coord   name   date   box color   name color   date color   URL Spouse, sibling, phantom, and special connections:
[SPC / SIB / JMP / PHC]   X-Y-Z coord1   X-Y-Z coord2   color   comment

Descendant connections:
DEC   X-Y-Z coord1   X-Y-Z coord2   X-Y-Z coord3   color   comment The current color selection is RED, GREEN, BLUE, WHITE, BLACK, YELLOW, CYAN, MAGENTA, LIGHTGRAY, MEDIUMGRAY, DARKGRAY, DARKRED, DARKGREEN, DARKBLUE, DARKYELLOW, DARKCYAN, and DARKMAGENTA.

The backround color can also be specified with the following statement:
BKG   <color>

-continued

Coordinates
Coordinates are specified in items of box position, as shown in the diagram:

Example (a three generation chart for Philip plus his brother Timothy and his aunt Terri)

```
IND  1 4 1   Philip Dain        1991-
IND  2 2 1   Bob Dain           1991-
IND  2 6 1   Wendy McNult       1991-
DEC  1 4 1   2 2 1       2 6 1
IND  3 1 1   Jerry Dain         1991-
IND  3 3 1   Arlene Blake       1991-
DEC  2 2 1   3 1 1       3 3 1
IND  3 5 1   Bob McNult         1991-
IND  3 7 1   Martha Loche       1991-
DEC  2 6 1   3 5 1       3 7 1
IND  1 4 2   Timothy Dain       1991-
SIB  1 4 1   1 4 2
IND  2 6 2   Terri McNult       1991-
SIB  2 6 1   2 6 2
```

The rendering of this chart looks like this:

What is claimed is:

1. A computerized method for creating three-dimensional graphics display data from tree-structured data, comprising the steps of:
   selecting tree-structured data set having discrete objects of interest;
   specifying elements of defining characteristics of each of the discrete objects of interest;
   specifying elements of tree-structured interconnecting characteristics of each of the discrete objects of interest;
   based on said steps of specifying elements of defining characteristics and specifying elements of tree-structured interconnecting characteristics, assigning each of the discrete objects of interest with coordinates in a three-dimensional coordinate system;
   encoding said elements of defining characteristics and elements of tree-structured interconnecting characteristics in combination with said coordinates in the three-dimensional coordinate system such that said tree-structured data set is restructured as said three-dimensional tree-structured data set; and
   converting said three-dimensional tree-structured data set to a known manner three-dimensional graphics display language display data set.

2. The method as set forth in claim 1, comprising the further step of:
   displaying said three-dimensional tree-structured data set with said known manner video graphics display language.

3. The method as set forth in claim 1, the step of specifying elements of defining characteristics of each of the discrete objects of interest further comprising:
   identifying discrete objects of interest having greater than one position in the tree-structured data set;
   as part of said step of specifying elements of defining characteristics of each of the discrete objects of interest, assigning a distinct identifying tag to each of said discrete objects of interest having greater than one position in the tree-structured data set; and
   duplicating each of the discrete objects of interest having said distinct identifying tag for each connection of the discrete object of interest determined in said step of specifying elements of tree-structured interconnecting characteristics of each of the discrete objects of interest.

4. The method as set forth in claim 3, the step of assigning (204–207) each of the discrete objects of interest with coordinates in a three-dimensional coordinate system further comprising:
   defining a root object of interest;
   assigning a first coordinate value of the three-dimensional coordinate system to the root object of interest for each coordinate; and
   assigning predetermined, inter-related, three-coordinate offset values for all other discrete objects of interest relative to said first coordinate values.

5. The method as set forth in claim 4, the step of assigning predetermined, inter-related, three-coordinate offset values for all other objects relative to said first coordinate values further comprising:
   separating the tree data set into data subsets including at least two classes,
      a first class having data sub-subsets defining characteristics representative of a macro-objects of interest; and
      a second class defining individual first class member identity defining characteristics for each member object of said macro-objects of interest,
         each said individual first class member in said second class having class member object data sub-subsets,
            said member object data sub-subsets including member identifying characteristic data tags representative of the individual first class member identity defining characteristics;
   selecting a data set root individual first class member;

determining if individual first class members are a member of more than one first class; and
if any of said individual first class members is a member of more than one first class, tagging said data sub-subset of each said individual first class member who is a member more than one first class in said second class with a said personal data tag representative of such members being a member of more than one first class;
setting the root individual first class member to first predetermined Cartesian coordinates; and
starting with the root individual first class member,
assigning to each of said individual first members a first three-dimensional Cartesian coordinate;
such that the data subsets and data sub-subsets are parsed wherein each of said individual first class members is assigned an identical first three-dimensional Cartesian coordinate,
except same level tree branch individual first class members and any of said individual first class members having a said personal data tag representative of such members being a member of more than one first class,
wherein same level tree branch individual first class members and any of said individual first class members having a said personal data tag representative of such members being a member of more than one first class are assigned next consecutive level Cartesian coordinate value, respectively;
assigning to each of said individual first class members a second three-dimensional Cartesian coordinate;
such that the data subsets and data sub-subsets are parsed wherein each of said individual first class members is assigned a second three-dimensional Cartesian coordinate incremented in a first direction for each step of ascendancy in said tree-structured data set and incremented in an opposite direction for each step of descendancy in said tree-structured data set; and
assigning to each of said individual first class members a third three-dimensional Cartesian coordinate,
such that the data subsets and data sub-subsets are parsed wherein each of said individual first class members is assigned a third three-dimensional Cartesian coordinate incremented in a first direction for higher relationships in said tree-structured data set and in an opposite direction for lower relationships in said tree-structured data set wherein third three-dimensional Cartesian coordinate increments are dependent on a maximum second three-dimensional Cartesian coordinate value, each offset between individual first class members being a multiple of the maximum second three-dimensional Cartesian coordinate value.

6. A computer memory device for converting two-dimensional data into a three-dimensional graphics display, comprising:
means for selecting a tree-structured data set having discrete objects of interest;
means for specifying elements of defining characteristics of each of the discrete objects of interest;
means for specifying elements of tree-structured interconnecting characteristics of each of the discrete objects of interest;
means for assigning each of the discrete objects of interest with coordinates in a three-dimensional coordinate system based on said steps of specifying elements of defining characteristics and tree-structured interconnecting characteristics;
means for encoding said elements of defining characteristics and tree-structured interconnecting characteristics in combination with said coordinates in the three-dimensional coordinate system such that said tree-structured data set is restructured as said three-dimensional tree-structured data set; and
means for converting said three-dimensional tree-structured data set to a known manner video graphics display language.

7. The device as set forth in claim 6, comprising:
means for displaying said three-dimensional tree-structured data set with said known manner video graphics display language.

8. The device as set forth in claim 6, the means for specifying elements of defining characteristics of each of the discrete objects of interest further comprising:
means for identifying discrete objects of interest having greater than one position in the tree-structured data set;
as part of said means of specifying elements of defining characteristics of each of the discrete objects of interest, means for assigning a distinct identifying tag to each of said discrete objects of interest having greater than one position in the tree-structured data set; and
means for duplicating each of the discrete objects of interest having said distinct identifying tag for each connection of the discrete object of interest determined in said step of specifying elements of tree-structured interconnecting characteristics of each of the discrete objects of interest.

9. The device as set forth in claim 8, the means for assigning each of the discrete objects of interest with coordinates in a three-dimensional coordinate system further comprising:
means for defining a root object of interest;
means for assigning a first coordinate value of the three-dimensional coordinate system to the root object of interest for each coordinate; and
means for assigning predetermined, inter-related, three-coordinate offset values for all other objects relative to said first coordinate values.

10. The method as set forth in claim 9, the means for assigning predetermined, inter-related, three-coordinate offset values for all other objects relative to said first coordinate values further comprising:
means for separating the tree data set into data subsets including at least two classes,
a first class having data sub-subsets defining characteristics representative of a macro-objects of interest; and
a second class defining individual first class member identity defining characteristics for each member object of said macro-objects of interest,
each said individual first class member in said second class having class member object data sub-subsets,
said member object data sub-subsets including member identifying characteristic data tags representative of the individual first class member identity defining characteristics;
means for selecting a data set root individual first class member;
means for determining if individual first class members are a member of more than one first class, and if any of said individual first class members is a member of more than one first class, tagging said data sub-subset of each said individual first class member who is a member of more than one first class in said second class with a said personal data tag representative of such members being a member of more than one first class;

means for setting the root individual first class member to first predetermined Cartesian coordinates; and means for starting with the root individual first class member and assigning to each of said individual first members a first three-dimensional Cartesian coordinate, such that the data subsets and data sub-subsets are parsed wherein each of said individual first class members is assigned an identical first three-dimensional Cartesian coordinate, except same level tree branch individual first class members and any of said individual first class members having a said personal data tag representative of such members being a member of more than one first class, wherein same level tree branch individual first class members and any of said individual first class members having a said personal data tag representative of such members being a member of more than one first class are assigned next consecutive level Cartesian coordinate value, respectively;

assigning to each of said individual first class members a second three-dimensional Cartesian coordinate, such that the data subsets and data sub-subsets are parsed wherein each of said individual first class members is assigned a second three-dimensional Cartesian coordinate incremented in a first direction for each step of ascendancy in said tree-structured data set and incremented in an opposite direction for each step of descendancy in said tree-structured data set; and assigning to each of said individual first class members a third three-dimensional Cartesian coordinate, such that the data subsets and data sub-subsets are parsed wherein each of said individual first class members is assigned a third three-dimensional Cartesian coordinate incremented in a first direction for higher relationships in said tree-structured data set and in an opposite direction for lower relationships in said tree-structured data set wherein third three-dimensional Cartesian coordinate increments are dependent on a maximum second three-dimensional Cartesian coordinate value, each offset between individual first class members being a multiple of the maximum second three-dimensional Cartesian coordinate value.

11. A computerized method for restructuring a genealogical data set into a three-dimensional genealogical data set display, comprising the steps of:

selecting a standard data format, two-dimensional, family tree data set;

restructuring the family tree data set into a data structure, specifying individual family member identity defining characteristics and specifying tree structure interconnection characteristics;

assigning each individual family member three interrelated three-dimensional coordinates based upon the data structure to form a data file compatible with known manner output data formats used in generating three-dimensional displays; and displaying the data file as a three-dimensional genealogical data set in a single video display.

12. The method as set forth in claim 11, the step of restructuring further comprising:

identifying all individual family members having greater than one position in the two-dimensional tree-structured data set;

assigning a distinct identifying tag to each of said individual family members having greater than one position in the family tree data set; and duplicating each of the individual family members having said distinct identifying tag for each connection of the discrete object of interest determined in said step of specifying elements of tree-structured interconnection characteristics of each such member.

13. The method as set forth in claim 11, comprising the steps of:

separating the family tree data set into data subsets including at least two classes, a first class defining characteristics representative of a family and a second class defining individual family member identity defining characteristics, each said class having class object data sub-subsets, including identifying individual's familial and personal data tags representative of said identity defining characteristics;

selecting a data set root individual;

determining if individual family members are a member of more than one first class, and if any of said individual family members is a member of more than one first class, tagging said data sub-subset of each said individual family member who is a member of more than one first class in said second class with a said personal data tag representative of such members being a member of more than one first class;

setting the root individual to first predetermined Cartesian coordinates;

starting with the root individual, assigning to each of said individual family members a first three-dimensional Cartesian coordinate, such that the data subsets and data sub-subsets are parsed wherein each of said individual family members is assigned an identical first three-dimensional Cartesian coordinate, except siblings and any of said individual family members having a said personal data tag representative of such members being a member of more than one first class, wherein siblings and any of said individual family members having a said personal data tag representative of such members being a member of more than one first class are assigned next consecutive level Cartesian coordinate value, respectively;

assigning to each of said individual family members a second three-dimensional Cartesian coordinate, such that the data subsets and data sub-subsets are parsed wherein each of said individual family mem bers is assigned a second three-dimensional Cartesian coordinate incremented in a first direction for each step of ancestry and incremented in an opposite direction for each step of descendancy; and assigning to each of said individual family members a third three-dimensional Cartesian coordinate, such that the data subsets and data sub-subsets are parsed wherein each of said individual family members is assigned a third three-dimensional Cartesian coordinate incremented in a first direction for maternal relationships and in an opposite direction for paternal relationships wherein third three-dimensional Cartesian coordinate increments are dependent on a maximum second three-dimensional Cartesian coordinate value, each offset being a multiple of the maximum second three-dimensional Cartesian coordinate value.

* * * * *